United States Patent
Smith et al.

(10) Patent No.: US 9,691,065 B2
(45) Date of Patent: *Jun. 27, 2017

(54) AUTOMATED TRANSACTIONS CLEARING SYSTEM AND METHOD

(71) Applicant: JPMorgan Chase Bank, N.A., New York, NY (US)

(72) Inventors: Christopher Arthur Smith, Tampa, FL (US); Lamour Guthrie Roberts, Riverview, FL (US); Kin Kei Chau, Naperville, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,348

(22) Filed: Nov. 15, 2013

(65) Prior Publication Data
US 2014/0074700 A1    Mar. 13, 2014

Related U.S. Application Data

(63) Continuation of application No. 13/595,523, filed on Aug. 27, 2012, now Pat. No. 8,930,267.

(51) Int. Cl.
*G06Q 40/00*      (2012.01)
*G06Q 20/38*      (2012.01)

(52) U.S. Cl.
CPC ................. *G06Q 20/38* (2013.01)

(58) Field of Classification Search
CPC ........ G06Q 10/00; G06Q 20/00; G06Q 30/00; G06Q 40/00; G06Q 10/10

USPC ...................................................... 705/3–44
See application file for complete search history.

(56) References Cited

U.S. PATENT DOCUMENTS

| | | | |
|---|---|---|---|
| 5,903,881 A * | 5/1999 | Schrader et al. ................ 705/42 |
| 7,676,407 B2 * | 3/2010 | Van De Van et al. .......... 705/35 |
| 7,991,694 B2 * | 8/2011 | Takayama .............. G06Q 20/04 705/41 |
| 8,190,528 B2 * | 5/2012 | Ginter ..................... G06F 21/00 705/52 |
| 8,229,807 B2 * | 7/2012 | ElBizri .......................... 705/30 |
| 8,244,595 B2 * | 8/2012 | Giese ...................... G06F 21/10 705/26.5 |
| 8,930,267 B1 * | 1/2015 | Smith .................... G06Q 20/38 705/39 |
| 2003/0167224 A1 * | 9/2003 | Periwal .................. G06Q 40/04 705/37 |
| 2004/0148252 A1 * | 7/2004 | Fleishman ...................... 705/39 |

(Continued)

*Primary Examiner* — Frantzy Poinvil
(74) *Attorney, Agent, or Firm* — Goodwin Procter LLP

(57) ABSTRACT

Embodiments of the present invention are related to systems and methods of verifying the integrity of transactions that traverse through complex system workflows, and particularly, verifying the integrity of financial and non-financial transactions that traverse through a plurality of financial systems making up one or more system workflows. In one embodiment, a clearing system is disclosed to include a central clearing engine configured for processing a plurality of transactions by retrieving transaction data of at least one transaction of the plurality of transactions from at least one data source based on a selection received. After parsing the transaction data, the central clearing engine may verify transaction data integrity based on the transaction data and determine a result, and generate a report based on the result.

20 Claims, 7 Drawing Sheets

(56) References Cited

U.S. PATENT DOCUMENTS

| | | | |
|---|---|---|---|
| 2005/0240524 A1* | 10/2005 | Van De Van et al. | 705/40 |
| 2007/0156527 A1* | 7/2007 | Rubinstein | G06Q 30/02 705/14.41 |
| 2009/0089113 A1* | 4/2009 | Rousso | G06Q 10/08 705/35 |

* cited by examiner

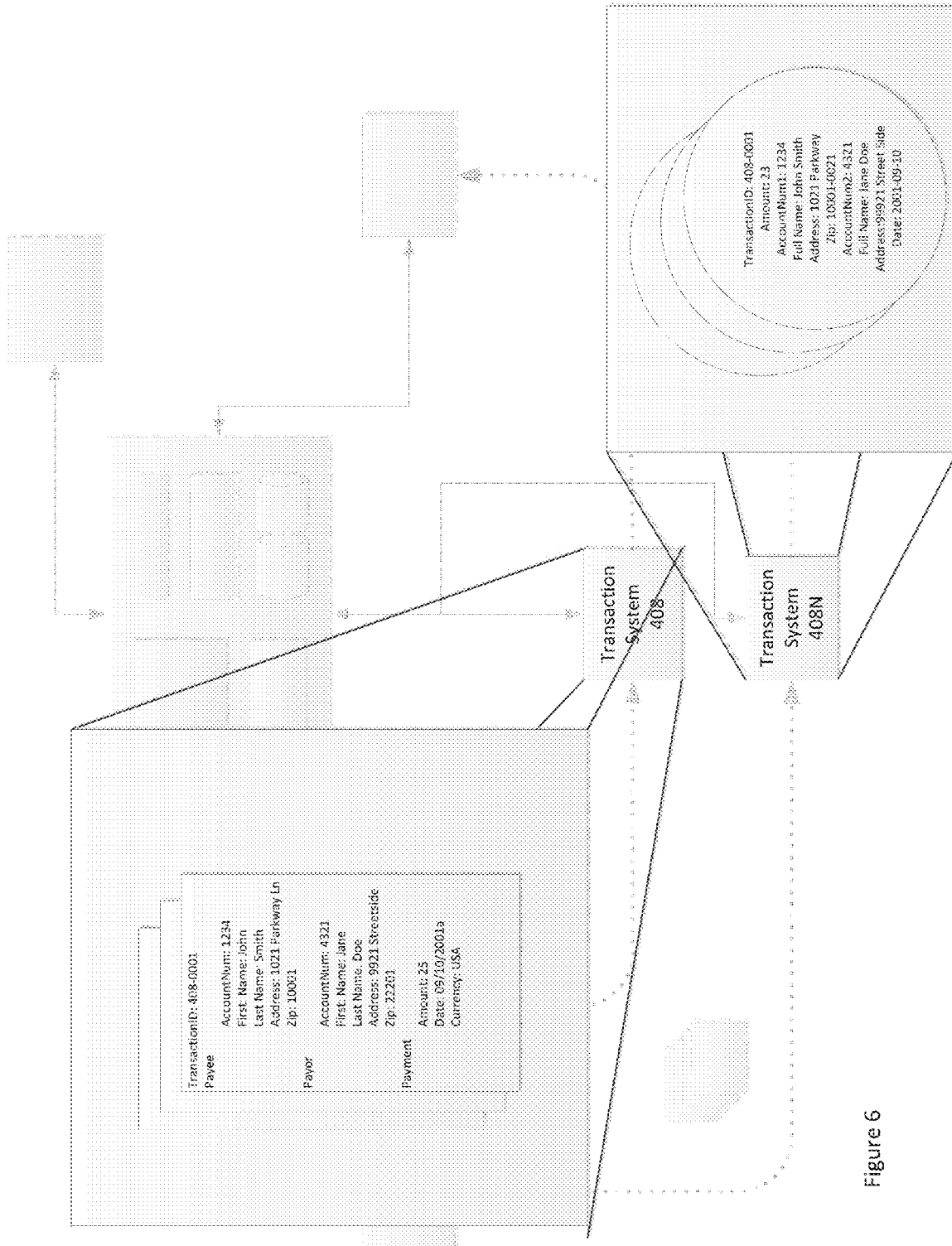

AUTOMATED TRANSACTIONS CLEARING SYSTEM AND METHOD

REFERENCE TO RELATED APPLICATIONS

The present application claims priority to, and is a continuation of, U.S. patent application Ser. No. 13/595,523, filed on Aug. 27, 2012, entitled, "Automated Transactions Clearing System And Method," which is incorporated herein by reference in its entirety.

FIELD OF THE INVENTION

Embodiments of the present invention are related to systems and methods of verifying the integrity of transactions that traverse through complex system workflows, and particularly, verifying the integrity of financial and non-financial transactions that traverse through a plurality of financial systems making up one or more system workflows.

BACKGROUND OF THE INVENTION

As millions of financial and non-financial transactions are received or created at a financial institution, such transactions often traverse through a number of computer systems for processing, each of which may process individual transactions according to specific purposes as dictated by the institution, the customers, and various other entities. A transaction may be received by one particular financial institution's computer system, verified by another for authenticity, and processed by yet others for various financial and systematic purposes. Indeed, each transaction may be read, processed, and transformed into different formats by a plurality of systems, of a financial institution, multiple times during its lifespan. In such workflows, with numerous systems transforming, modifying or deleting transactional data, errors can—and often do—occur. Even subtle or minor changes within a transaction can ultimately have substantial client impact and cause unforeseeable and catastrophic results.

When the legacy systems of a financial institution are upgraded or replaced by newer and more modern systems, the functionality of the systems must be maintained and negative client impact must be minimized. In order to ensure proper operations, one method utilized in the industry has been to verify that the outputs of these new systems at each step of a workflow (i.e., the transactions outputted at each system), are accurate by ensuring that the outputs are consistent with the outputs of the legacy systems they are replacing. Yet, the only known and utilized manners of verifying the integrity of these transactions are through methods that are largely manual in nature. An analyst may manually check that each field of a transaction has not been erroneously modified as it traverses from one system to next. Alternatively, an analyst may copy text of transactions to text documents and utilize text-compare software to determine differences in the text.

With millions of transactions processed by each system of a financial institution, the currently utilized manual methods of verifying the proper operations of the transactions is inefficient, to say the least. Furthermore, each individual system of a financial institution may receive and process a number of distinct data files and file types over a number of different channels. When this is combined with the large number of possible errors and error types that may occur at each system, including those that may be unique only to a particular computer system or a version of the system, proper and efficient verification of system operations through manual means is made even more difficult, if not impossible.

Accordingly, a solution is needed to efficiently and accurately verify the integrity of the transactions as they are processed by various systems of a financial institution. Such solutions would be invaluable in verifying the proper operations of new or upgraded systems of financial institutions as well as the proper operations of existing systems along a workflow.

In one aspect of the present invention, a transaction clearing system for verifying a plurality of transactions at a plurality of transaction systems is disclosed to include a user interface engine and a central clearing engine. The central clearing engine may be configured for processing a plurality of transactions. In particular, it may retrieve transaction data of at least one transaction of the plurality of transactions from at least one data source based on a selection received by the user interface engine and may parse such transaction data. After parsing the transaction data, the central clearing engine may verify transaction data integrity based on the transaction data and determine a result, and generate a report based on the result. In addition, the user interface engine not only facilitates the receiving of user selections for verifying a plurality of transactions (so as to verify the transactions), but further provides the report.

Embodiments of the present invention allow fir a user to select, via the user interface engine, a selection of a plurality of testing transactions, a workflow, or a selection of transaction systems from which transaction verification may be completed. For example, where the user selects a plurality of testing transactions, such transactions may be retrieved from one or more data sources. Where the user selects a workflow, the transactions that traverse such workflows may be retrieved from one or more data sources. Similarly, where the user selects one or more transaction systems, transactions from such transaction systems may be retrieved. In one embodiment, the central clearing engine retrieves transaction data from at least two sources: first transaction data from a first transaction system and second transaction data from a second transaction system for processing.

The transaction clearing system may perform the verification of transaction integrity by comparing the first transaction data with the second transaction data. Numerous methods of comparison may be performed, including comparing the transaction data on a letter-by-letter basis and on a bit-by-bit basis. The central clearing engine may also compare the first transaction data and the second transaction data based on business logic by comparing the fields of the first and second transaction data. In one embodiment, the comparison of the first transaction data and the second transaction data is further in accordance with a common unique identifier of the first and second transaction data.

In addition to verifying transaction integrity by comparing the first transaction data with the second transaction data, the transaction clearing system may also be configured to verify transaction data integrity based on integrity rules or transaction standards. In one embodiment, the system may determine the results of the transaction integrity verification based on a pass/fail determination.

Further, in at least another embodiment, the transaction clearing system further includes a system model database that stores transaction model data of the plurality of transaction systems. In such embodiments, the central clearing engine may parse the transaction data and/or retrieve transaction data based on the transaction model data. Further, in one embodiment, the transaction clearing engine may parse the plurality of transactions into a plurality of transactions and parse each transaction of the plurality of transactions into a plurality of fields.

In another aspect of the present invention, a clearing system for verifying a plurality of transactions at a plurality of transaction systems is disclosed. The clearing system includes a central clearing engine for processing transactions and performs at least the steps of retrieving transaction data of the plurality of transactions from at least one data source based on a received selection and verifying transaction data integrity based on the transaction data from the at least one data source. Also, the central clearing engine verifies the transaction data based on information from at least one system modeling database. In addition, a user interface engine is included as part of the clearing system to receive a selection for verifying a plurality of transactions at a plurality of transaction systems and providing a report.

In yet another aspect, a computer-controlled method for verifying a plurality of transactions at a plurality of transaction systems is disclosed. The method includes the step of receiving a selection for verifying a plurality of transactions and retrieving transaction data of the plurality of transactions from at least one data source based on a received selection. Further, the transaction data is parsed and the transaction data is verified for transaction data integrity. Further, the method includes the step of determining the results and generating a report from the results.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 6 illustrates exemplary transaction data of transactions retrieved and parsed by a transaction clearing system in accordance with an embodiment of the present invention.

DETAILED DESCRIPTION OF THE INVENTION

Figure 1:
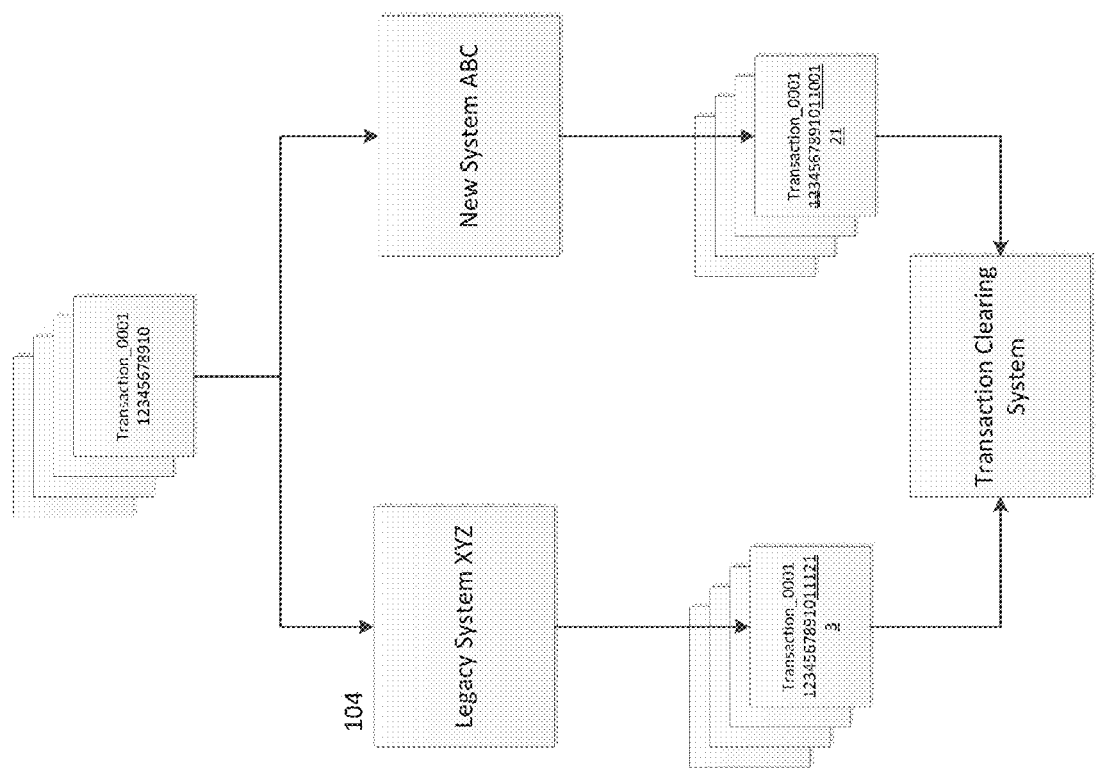
FIG. 1 illustrates an exemplary financial computing system environment where a transaction clearing system may be implemented in accordance with an embodiment of the present invention.

FIG. 1 illustrates an exemplary financial computing system environment and, in particular, illustrates how transactions are received and processed by a financial institution's system. Numerous transactions may be received at a financial institution, each of which may be processed according to the transaction. For example, the transaction may be in the form of a credit card payment that must be processed by systems of the financial institution. One system may verify that the credit card payment transaction contains the correct authentication information and is not a fraudulent transaction. Once verified, another system of the financial institution may notify the customer, or a third party, that the transaction is authorized. Another system may post the transaction in the customer's account. Along the way, the data contained within each transaction may be modified to add, delete or modify data as it is outputted from one system and passed to the next. Thus, as seen at 104, the transaction traffic may be received and processed by legacy system XYZ. The transactions received at the legacy system may be transformed during processing, such as, for example, to a transaction format that is utilized by that particular system. Further, additional data may be added to each transaction. As seen, for example, Transaction_9001 is modified by legacy system XYZ to add additional data 111213.

When computer systems are upgraded, new systems may be implemented within the system alongside their legacy counterparts. Thus, as seen in FIG. 1, a new system ABC will soon replace legacy system XYZ and may be implemented and tested to ensure proper operations. New system ABC may be implanted to also receive and process the transaction data that the legacy system XYZ receives and processes. As a person of ordinary skill in the art has recognized, new systems that are implemented often do not operate as desired, and in many cases, modify transaction data erroneously, as briefly discussed above. As seen, for example, Transaction_0001 here may have been erroneously modified to not only include incorrect data, but also having portions of its transaction data deleted. With thousands or even millions of transactions processed by such systems in a given period, it is difficult to efficiently and accurately detect differences in transaction data outputted from these systems.

A system and computer-implemented system and method to ensure the integrity of financial transactions and non-financial transactions as they traverse through a complex workflow of systems is disclosed that meets the current needs of the industry. Embodiments of the present invention operate to verify the proper operation of the new system in an efficient and accurate manner while overcoming the shortcomings of currently known solutions. Embodiments of the transaction clearing system may be configured to programmatically process millions of transactions at any number of computer systems to detect numerous types of errors, even when the systems support varying transaction data formats. Furthermore, the system and method disclosed herein may be utilized in regressions testing on multiple baselines of the same systems as well as across multiple systems.

FIG. 1 illustrates how a transaction clearing system may be implemented in its operating environment accordance with an embodiment of the present invention. As seen, transaction clearing system may be implemented to retrieve transaction traffic outputs from both the legacy system and the new system to detect any differences or errors in an efficient and accurate manner. In one preferred embodiment, the present invention may perform a pass/fail comparison to determine whether the new system is operating properly by outputting transaction data that is the same or, in some cases, largely the same as the transactions outputted from the legacy system. In response to the comparison performed the system may provide the results in a report. While this is the preferred use of the present invention, embodiments of the clearing system may further process transactions outputted from systems to verify that the transactions are in a proper format or structure. Embodiments of the clearing system may further determine errors of transactions at more than just one or two systems, but, rather, may be configured to detect and identify differences and/or errors at any number of systems and at any number of steps of a transaction workflow.

Figure 2:
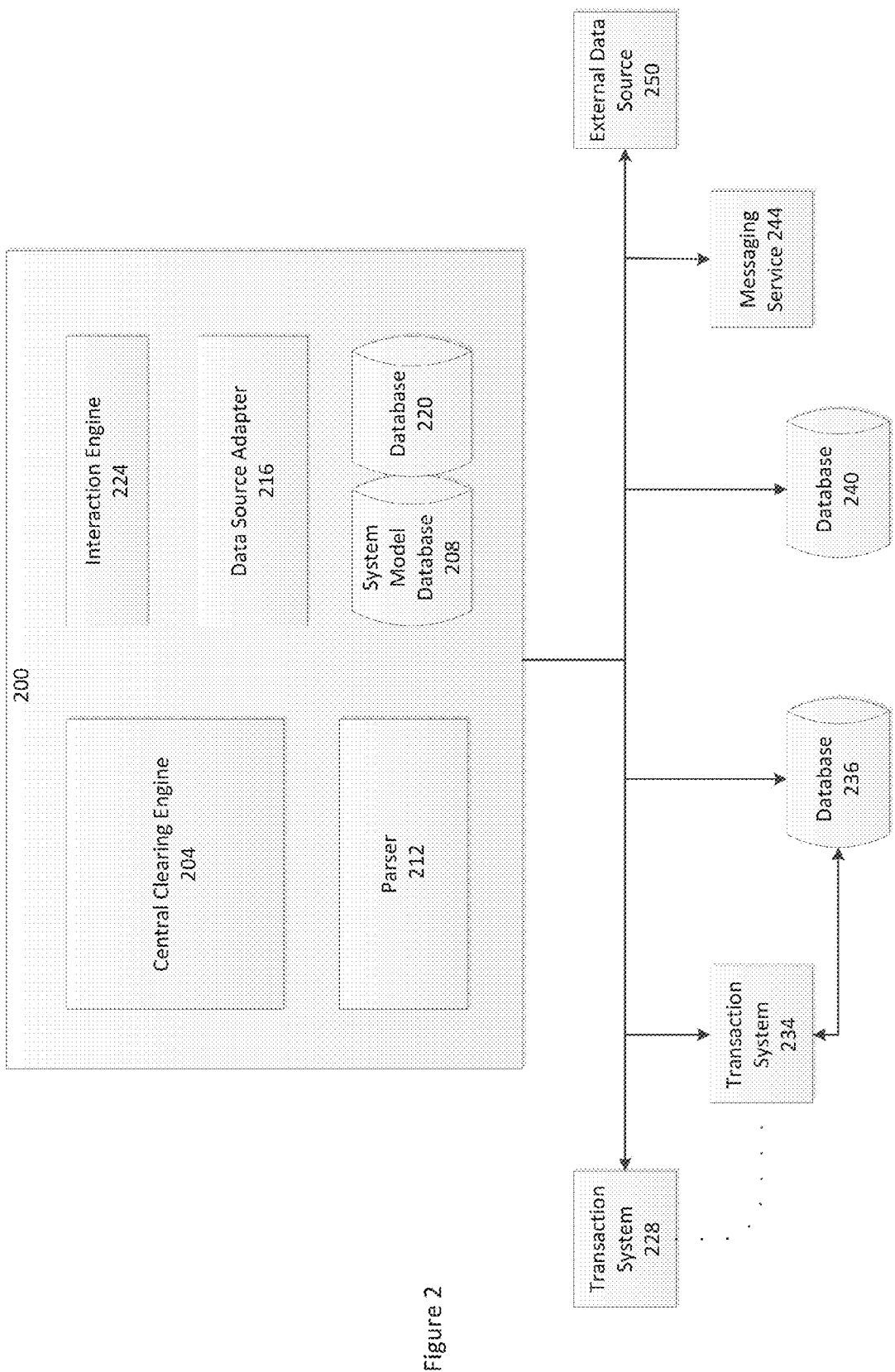
FIG. 2 depicts a block diagram illustrating an automated transaction clearing system in accordance with an embodiment of the present invention.

FIG. 2 depicts a block diagram illustrating an automated transaction clearing system 200 (hereinafter referred to as a "clearing system") in accordance with an embodiment of the present invention. The clearing system 200 includes a central clearing engine 204, system model database 208, parser 212, data source adapter 216, database 220, and interaction engine 224. Furthermore, the clearing system 200 may be connected to a plurality of data sources 228-250. In the preferred embodiment, the clearing system 200 is capable of accessing a wide range of heterogeneous data sources including relational databases Mainframe, Tandem, Windows, UNIX and Messaging systems. In the embodiment illustrated in FIG. 2, data sources 228-250 may include transaction systems 228-234, databases 236-240, messaging service 244, and external data source 250.

Figure 3:
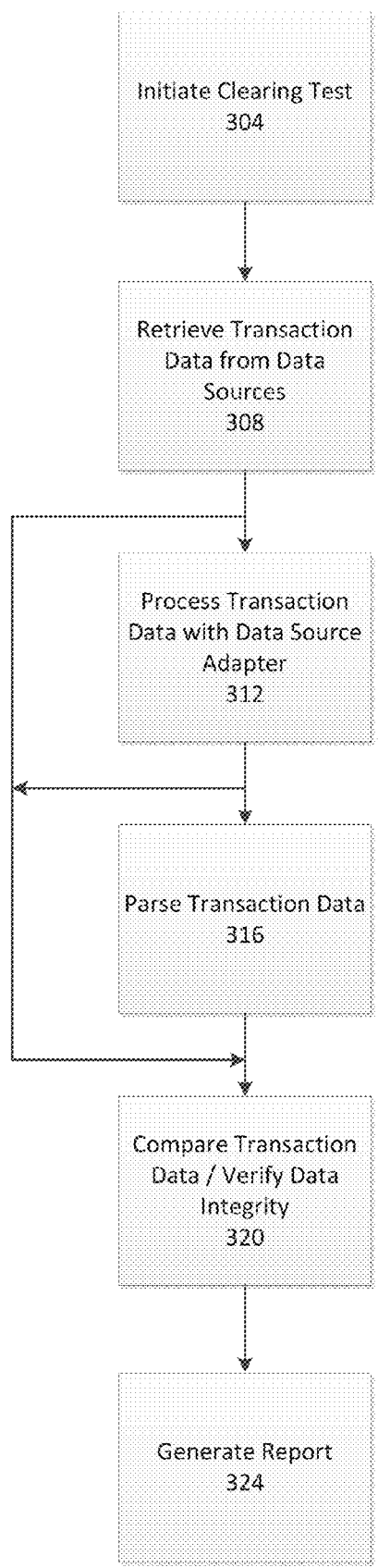
FIG. 3 illustrates an exemplary method performed by the clearing system to identify transaction data errors in accordance with an embodiment of the present invention.

FIG. 3 illustrates an exemplary method performed by the clearing engine 204 to identify transaction data errors in accordance with an embodiment of the present invention. At 304, a user may initiate a system output integrity test (i.e., a "clearing test,") through the use of one or more user-interfaces generated by the interaction engine 224, a system which enables user interaction with the clearing system 200. As part of the user interaction, the user may configure the clearing test by selecting one or more data sources 228-250, or portions thereof, that the clearing system 200 should process. The user may limit the analyses performed to any number and type of transaction based on one or more definable attributes or criteria. For example, system outputs sways be limited to a number of credit card transactions received and processed by the transaction system on a specific day or week. Other types of error detections may require the selection of different sets of data sources. Once the user has entered such information, the clearing system 200 may validate the information entered and may invoke various components including parser 112 and data source adapter 116 to initiate the clearing test as defined by the user.

At 308, the clearing engine 204 may cause the transmittal of a request and the receiving of transaction data from the selected one or more data sources 228-250. In one embodiment, the transmittal of the request and the receiving of transaction data may be completed through the data source adapter 216, which may operate as a single and common communication point from which the clearing system 200 may communicate with the data sources 228-250, since each data source may operate with different hardware and software systems with distinct interfaces. For example, data source adapter 216 may allow the clearing system 200 to connect to, communicate with and retrieve data from various relational model databases, such as those databases operating under IBM DB2, MySQL, and others well known in the art. The data source adapter 216 may receive and process data from any data source 228-250 into a system format or structure such that the other engines and components of the clearing system 200 may properly interpret the received data. In one preferred embodiment, the data source adapter 216 is a Java-based computer program developed to support a wide variety of data sources.

Through the use of data source adapter 216 and other communication means, the clearing engine 204 may receive data from transaction systems 228-234, which may include any number of computer systems of a financial institution that receive and/or process transaction data. For example, transaction systems 228-234 may include application services systems, customer services systems, retail services systems, ATM services systems, adjustment services systems, reconcilement services systems, fraud services systems, collection services systems, as well as portions of such systems.

The clearing engine 204 may also receive transaction data from one or more databases 236-240 at 308. Databases 236-340 may be stand-alone databases that are utilized by internal or external systems of an institution. Such databases may also be databases that are at, or are connected to, any of the financial transaction systems 228-234. Indeed, such databases need not be limited to those that commonly held databases of a financial institution, but further include other types of databases well known in the art.

Further still, the clearing engine may receive transaction data by communicating with one or more messaging services, such as messaging service 244. Messaging service 244 may include software or hardware infrastructures that support the sending and receiving of messages between distributed systems. In one preferred embodiment, messaging service 244 may support message-oriented middleware platforms and/or systems that allow for the communication of messages (i.e., data) across multiple types of platforms, such as Windows, Linux, OS/2, IBM mainframe, Unix, and others, and across multiple types of network protocols. Examples of messaging services include IBM's Websphere MQ, Java Messaging Service (JMS), XMS for C/C++, .NET, SOAP, and others. Such systems may allow for the retrieval of transaction data in an asynchronous manner, thereby improving the flexibility of transaction data retrieval. Moreover, various messaging services may be configured to automatically retrieve transaction data outputted from various transaction systems, databases, and/or other sources. Thus, the messaging service 244 may be utilized by the clearing system 200 as an additional source of transaction data.

The clearing system 200 may also receive transaction data from external data source 250, such as transactions information from other branches, other financial institutions, social networks, regulating agencies, and others, each of which may comprise any number of systems and/or databases.

At 312, the output of data, whether retrieved via the source adapter 216, messaging services 244, or from transaction systems 228-234, databases 236-240, messaging services 244, or other data sources, may then be received and processed by the data source adapter 216. As transaction data received may be in various formats or structures, the data source adapter 216, in one embodiment, may be utilized to convert the transaction data into a format or structure that may be efficiently processed and interpreted by the various components of the clearing system 200. The transaction data as processed may then be stored at database 220.

At 316, parser 212 may then be utilized to parse the received transaction data into one or more transactions. Thus, where the clearing test involves the testing of thousands of unique transactions from each transaction system, parser 212 may identify and separate the data into individual transactions. The parser 212 may also be configured to identify the relevant data portions that make up each transaction, such as its unique identification number, the account number, and so on. The parser 212 may identify relevant transaction data portions by accessing the system model database 208. The system model database 208, in one embodiment, is a library of data source models that describe the structure of each transaction at each data source 228-250.

For example, the system model database 208 may describe that the transactions at transaction system 228 contain 5 fields: a transaction identifier, account number, transaction amount, payee information, and payor information. In one embodiment, whether the parser 212 detects and breaks down the transactions into one or more data portions may be dependent on the data source itself. The system may detect the various portions of a transaction and whether two or more systems are being compared that have distinct transaction structure.

At 320, the clearing engine 204 may process the parsed transactions data to verify the integrity of the transactions across the selected data sources and automatically identify possible errors. The transaction engine 204 may be configured to detect errors between two or more data sources at any configurable data level. For example, it may detect that Transaction_0001 as outputted from new system ABC and legacy system XYZ, as shown in FIG. 1, differ. It may detect errors not only through a straight comparison of the data received from data sources 228-250 but may also detect errors based on business logic, such as a comparison of the transactions on a field-by-field basis. In the preferred embodiment, the clearing engine 204 may be configured to not only detect errors of transactions data between two or more data sources, but it may further be configured to detect errors of each step of an entire transaction workflow across multiple systems, from the instance the transaction is received at the financial institution to when the transaction is closed.

At 324, the clearing engine 204 may generate a report describing the errors detected. For instance, the report may present the user with an identification of the differences between each of the transactions that were found to differ in content, structure or in other manners. The difference may be highlighted to the user in the report and the specific portions of the transaction that differ may be highlighted for easy identification to the user. The user may also be presented with a proposed fix.

After 324, the method ends. The method shown in FIG. 3 is merely for exemplary purposes and should not be read to limit the scope of the present invention. Indeed, the steps described are used to provide the general functions of each of the components of the clearing engine. Additional embodiments and features of the clearing system 200 and its components are discussed further in other portions of this disclosure.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or may include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The computer 400 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 4:
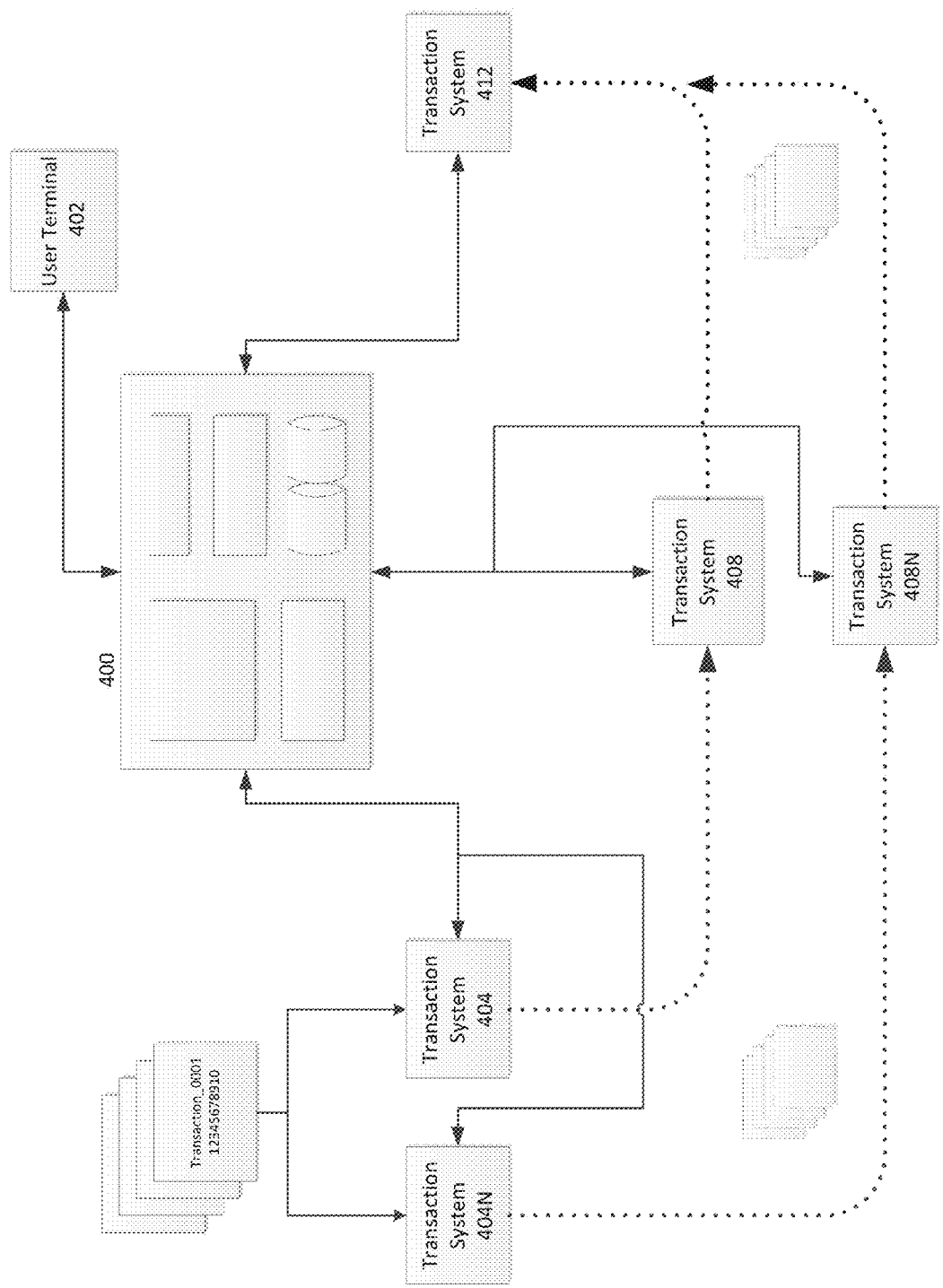
FIG. 4 illustrates a clearing system in an exemplary working environment in accordance with an embodiment of the present invention.

FIG. 4 illustrates a clearing system 400 in an exemplary working environment in accordance with an embodiment of the present invention, which like the clearing system 200, may include all or some of the same engines and/or components, including: a central clearing engine, a system model database, a parser, a data source adapter, messaging service, a database, and an interaction engine. As seen, clearing system 400 may also be connected with transaction systems 404-412, each of which may be a part of a transaction workflow. That is, a transaction received at a financial institution may be received at transaction system 404, transformed by transaction system 404, and outputted to transaction system 408, where it is modified and outputted to transaction system 412. At transaction system 412, the transactions may also be received, modified and outputted as well.

A user of the clearing system 400 may access the clearing system 400 through a terminal 402 connected to the clearing system 400 by way of an internal system network or an external network, such as the Internet. In one preferred embodiment, the clearing system may be accessed through a web browser, though other embodiments may allow the user to access through various executable applications, existing services, as well as other means well known in the art. For example, the clearing system 400 may be accessed through a mobile phone or through existing platforms from which access capabilities have been integrated.

As discussed above, embodiments of the present invention verify the proper operation of new transaction systems that are replacing legacy systems. A user may access the clearing system and control the operations of the clearing system 400 by defining the data sources for testing. The user, for example, may be a member of a team in charge of replacing the existing legacy financial system with a new and modern financial system that is capable of fulfilling the same purpose or substantially the same purpose as the legacy system it replaces.

The user may define the data sources at the transaction systems 404-408 by selecting the systems that he or she would like to test. In one embodiment, the user is presented with a topographical map or diagram generated by an interaction engine of the clearing system 400 containing all the known financial systems of the financial institution along with other external systems, with each of the systems connected by lines indicating the paths of transactions from one computer system to another. The user may interact with the user interface to navigate and select one or more systems for testing and for viewing information about each system. The user may further select new systems that may be replacing existing systems. Thus, in one embodiment, the user may select legacy transaction systems 404-408, along with new transaction systems 404N-408N, which are systems that are replacing the legacy transaction systems 404-408. The user may further select additional systems with transaction data that also need to be compared. For example, in addition to transaction systems 404N-408N, the user may select 404N2-408N2 (not shown) for comparison against the transaction systems 404-408 and 404N-408N. In one embodiment, the clearing system 400 may automatically detect one or more systems that are replacing each selected legacy transaction system, such as transaction systems 404-408.

The user may also simply select one or more transactions for testing. For instance, the user may enter transaction numbers to identify the transactions that he or she would like to test. In response, the clearing system 400 may automatically detect the transaction systems that receives, modifies and/or outputs the selected transactions and may further automatically detect any new systems that may be replacing any legacy systems. In one embodiment, the clearing system communicates with each of the known transaction systems to determine the transaction systems that contain transaction data of the selected transactions. It may further retrieve the transaction data of such transactions for processing.

Similarly, the clearing system 400 may also be capable of receiving a user selection of a transaction workflow, whereupon the transaction systems making up the workflow may be automatically determined by accessing a workflow database or by communicating with the transaction systems. The user may, for example, identify a particular transaction workflow according to a workflow identifier. Moreover, in one embodiment, users may define workflows as desired and may save each clearing test as a particular workflow. Thus, a user may define the transactions that traverse transaction systems 404-408 and 412 as one single workflow and simply recall such workflow at a later time for testing.

In addition to defining the scope of the testing, the user may also need to define the structure of transactions outputted at each system. For example, the user may define structure of the transactions at transaction system 404 as to contain a plurality of data fields, including transaction ID, user name, address, social security number, account number, and so on. The clearing system 400 may save this information at a system model database of the clearing system for future retrieval and use. Thus, in one embodiment, the clearing system 400 may store structural information of each type of transaction of each data source. By managing and updating this system model database over time, the clearing system 400 may automatically retrieve the structure of the transactions at any time for various uses, including to properly parse each transaction into the plurality of transaction fields. In one embodiment, in response to a user selecting a transaction system testing, the clearing system 400 may automatically connect to such transaction system to request and/or retrieve transaction data and automatically detect the structure of the transactions outputted at the transaction system accordingly.

The clearing system 400 may walk the user through creating the clearing test request to ensure that any automatic system and transaction structure detection and determination is correct. For example, in response to the user's selection of a transaction, the user may be asked to verify that each transaction system, as automatically detected, is part of the workflow of the selected transaction and that the automatically detected transaction structure at each transaction system is correct. In one embodiment, the user may select specific transaction fields that the clearing system 400 should test.

Embodiments of the present invention are capable of conducting numerous other types of tests than just a comparison of the transaction data at two or more systems. For example, the user may also select transaction system 412 to verify that the transactions at a system are in compliance with one or more defined rules or are in a particular structure (e.g., contains the correct types and number of fields). For instance, the user may ensure that each transaction at a transaction system 412 is in compliance with a transaction standard defined by the International Organization of Standardization, also known as an ISO standard. Other actions that may be taken by clearing system 400 in relation to a transaction system may include ensuring that the transactions data at a transaction system 412 is properly stored at one or more databases and ensuring that each output of transaction data is properly outputted to a regulating agency or other financial institutions. The clearing system 400 may also verify that each of the transactions outputted at a transaction system is in the proper structure.

In FIG. 4, in response to the user initiating the clearing test, the clearing system 400 may automatically execute a plurality of queries to the transaction systems to retrieve the output of the transaction systems. Where the user has defined one or more transactions for testing, the query may limit the retrieval of the transaction data to those selected transactions. In this exemplary case, transaction queries are sent from clearing system 400 to each of the transaction systems 404-408, 404N-408N and 412 for transactions received at such systems having transaction identifiers in the range of [0001] to [0500]. The transaction system 400 may send the query through a messaging service, as well.

In another embodiment, the clearing system 400 may have direct access to one or more databases of each transaction system such that no query need be sent. The clearing system 400 may directly retrieve the transaction data from the proper database. In one other embodiment, the clearing system 400 may track the output of transaction systems. Upon the initiation of the clearing test, the clearing system 400 may retrieve all transaction data of the selected transactions when the selected transactions are detected to be outputted from the transaction systems.

In response to query requests, the clearing system 400 may receive from transaction systems 404-408, 404N-408N and 412, transaction data containing transactions [0001] to [0500]. The clearing system 400 may store all information received for analysis. In one embodiment, the clearing system 400 may then parse the transaction data received from the transaction systems into one or more transactions. The parser of the clearing system 400 may be configured to readily process the transaction data of any transaction system, regardless of the format of the transaction data. In one embodiment, the clearing system 400 may convert each transaction into a standard clearing system format or may process the transaction data with a data source adapter of the clearing system.

The clearing system 400 may further parse each transaction to detect the individual data fields of each transaction. It may perform this detection based on the identified or determined transaction structure. Other manners of parsing the transaction data may be utilized. As discussed below, in certain cases, the transaction data received from the transaction systems may not be parsed at all prior to comparison.

The clearing system 400 may then perform a comparison of the transaction data at each set of systems that are to be compared. Thus, the transaction data outputted from transaction system 404 may be compared with transaction data outputted from transaction system 404N, transaction data outputted from transaction system 406 is compared with transaction data outputted from transaction system 406N, and so on.

How the transaction data outputted from each transaction system is processed by the clearing system 400 may vary based on the transaction systems compared or the structure of the transactions compared. Thus, the clearing system 400 may utilize the transaction structure information defined by the user or retrieved from the system model database to determine how the transactions should be compared.

Where the transaction systems compared are determined to utilize a common transaction data structure, the clearing engine 400 may perform a comparison between the underlying data of the transactions. For example, the clearing engine 400 may determine that the data structure of transaction systems 404 and 404N to be the same or sufficiently similar and clearing system 400 may perform a straight comparison of the transaction data. The clearing system 400, thus, may compare the transaction data received from transaction system 404 with the transaction data received from transaction system 404N through a bit-by-bit comparison. In another preferred embodiment, the text making up the transaction data may be compared on a character-by-character basis. Other types of comparisons at various levels or data layers can also be utilized, including any comparison methods well known in the art. The clearing system 400 may compare the transaction data of each transaction or may compare the entire set of transaction data (i.e., data of transactions comprising transactions [0001] to [0500]).

Figure 5A:
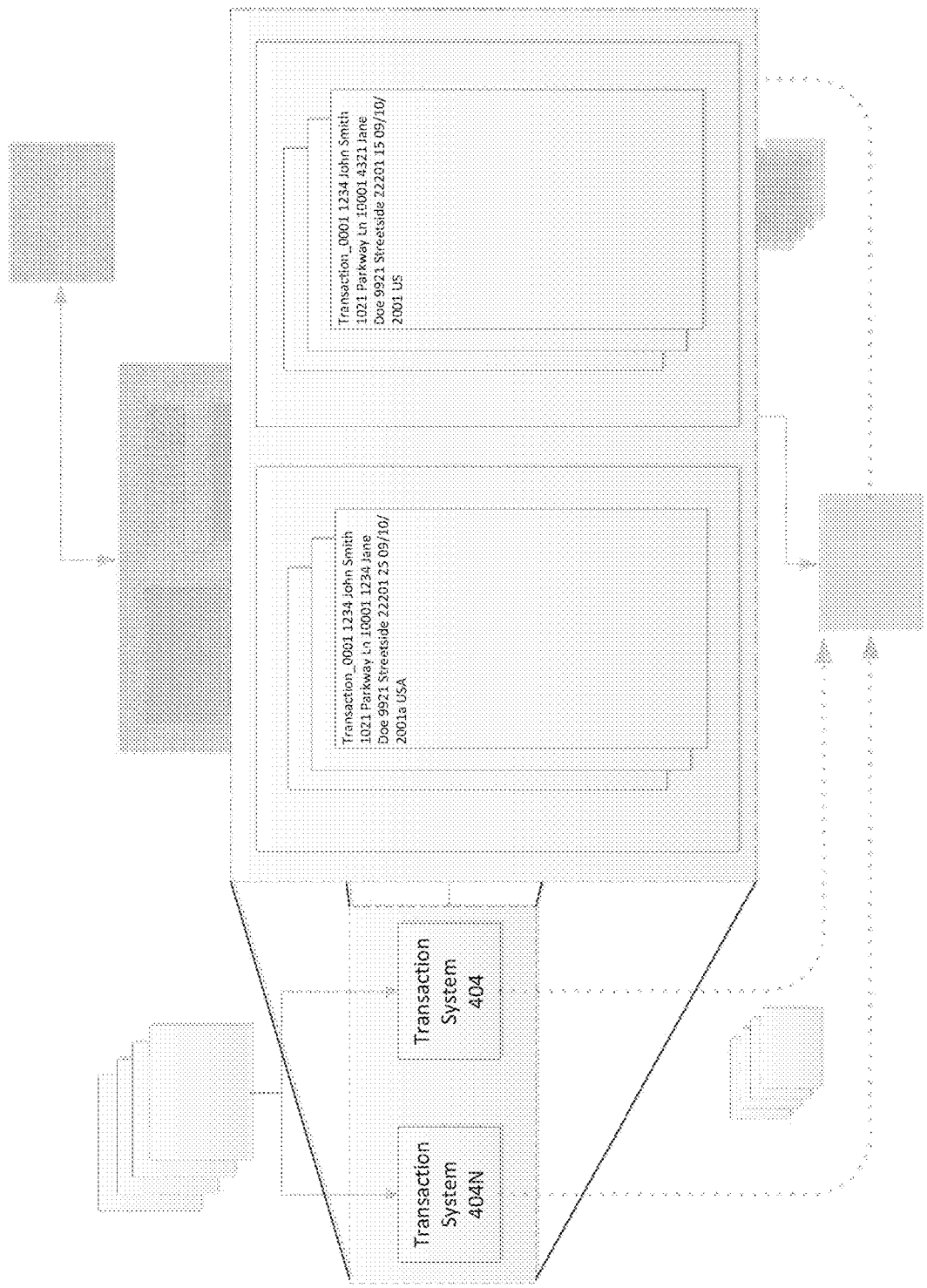
FIGS. 5A-B illustrate exemplary transaction data of transactions retrieved and parsed by a transaction clearing system in accordance with an embodiment of the present invention.
Figure 5B:
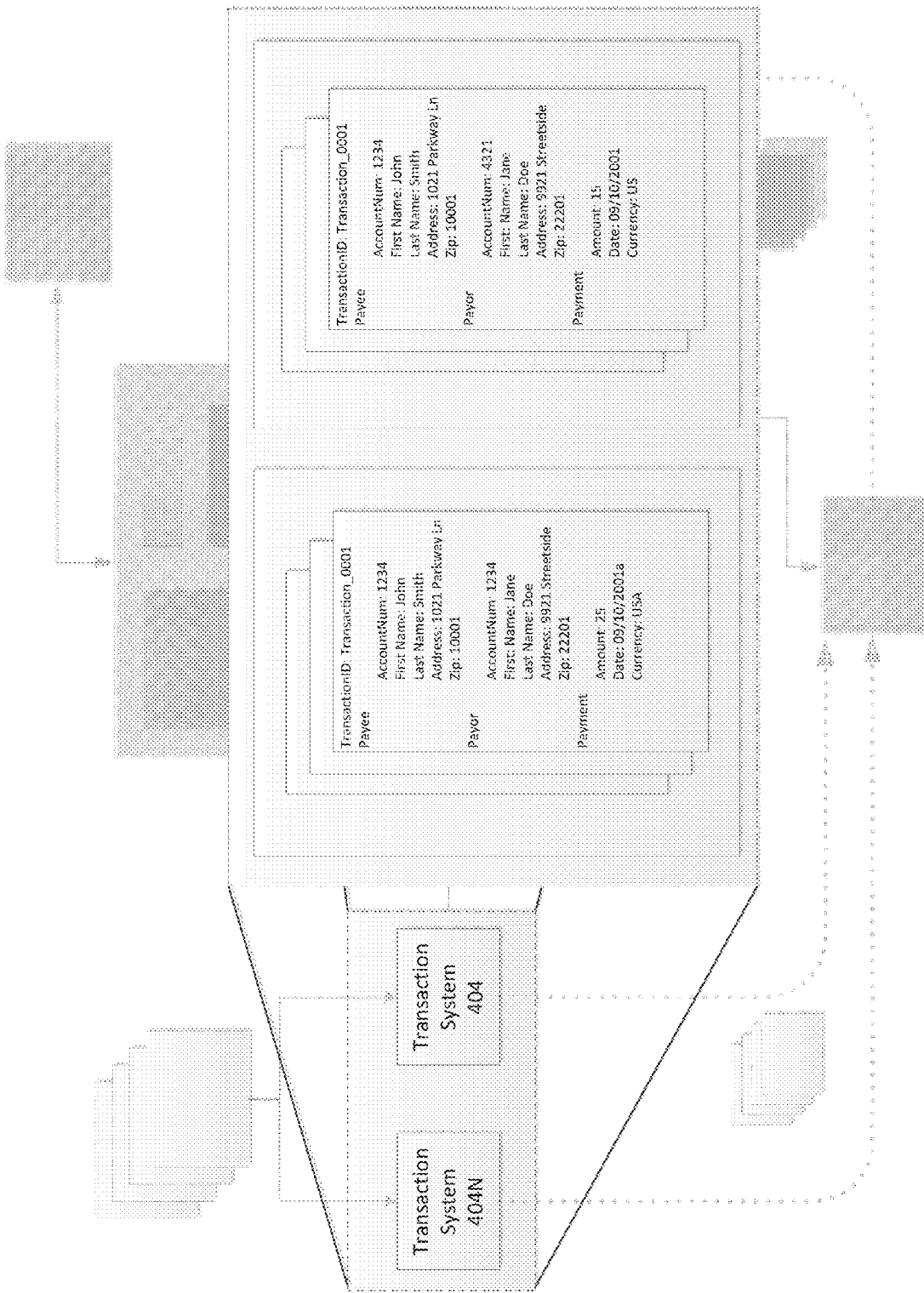

FIG. 5A illustrates exemplary transaction data of transactions retrieved and parsed from the transaction data of the legacy transaction system 404 and new transaction system 404N. Note that other engines, databases and components of the transaction systems 404 and 404N have been intentionally left out of the Figure but should be readily apparent that these systems 404 and 404N may contain any number of engines, databases and/or components. In the example illustrated, the transaction data received from the transaction systems 404 and 404N have been parsed into individual transactions by the parser of the clearing system. In one embodiment, the individual transactions may be further parsed into a plurality of fields, as seen in FIG. 5B. As seen by FIG. 5B, the structure of the transaction data from transaction systems 404 and 404N are identical with one another, comprising a transaction identifier, a payee and payor account information (e.g., account number, name, address), a transaction amount, date and currency. While a comparison may be made on a field-by-field basis, this is not necessary where the transaction systems being compared are determined to utilize a common transaction structure. Thus, because the transactions from both transaction system 404 and 404N are of the same structure, a straight comparison of the underlying data of the transactions (such as shown in FIG. 5A) can be completed (e.g., on a letter-by-letter basis). Through the comparison, the clearing engine 400 may detect that transaction system 404N has erroneously modified the account number of the payor, the payment amount, the date, and the currency in the example depicted.

The clearing engine 400 is also capable of processing transaction data outputted from transaction systems that utilize transaction structures that are wholly distinct. The transactions may contain different fields and/or are in wholly different data formats. Thus, where the transaction systems compared are determined to utilize distinct transaction data structures, clearing system 400 may automatically detect the differences of the transaction data based on business logic. Thus in FIG. 6, where the structure of the transactions at transaction system 408 differs from the structure of the transactions at system 408N, clearing system 400 may parse transaction data received from financial systems 408 and 408N not only into individual transactions, but may further process each individual transaction into fields.

Based on the parsed fields, the clearing system may identify each field of a transaction. In turn, each set of fields of a transaction may be compared with one another accordingly. FIG. 6 for example, illustrates exemplary transaction data of a particular transaction retrieved and parsed from the output retrieved from the legacy transaction system 408 and new transaction system 408N. As seen, while the data structure of transaction 408-0001 and transaction 408N-0001 may differ greatly each transaction, they contain several of the same fields, including a unique transaction identifier, amount, account number, address field, and zip code. Thus, the clearing engine 400 may then perform comparisons of each set of fields for each transaction. Through the comparison, the clearing engine may detect that transaction system 408N has erroneously modified the amount, the address and zip code of the payee.

In the preferred embodiment, each transaction may be identified with a unique transaction identifier, which remains constant across all transaction systems. This transaction number may uniquely identify transactions even as they traverse numerous transaction systems and even if modifications are made to the format or other data fields. Using this number to identify the transaction data, the clearing engine 400 may therefore determine that transactions of two or more data sources correspond to the same transaction. Thus, clearing system 400 may determine that transactions depicted of transaction systems 408 and 408N are of the same transaction since they both have the transaction number 408-0001.

Thus, the clearing en compare the relevant fields making up a transaction to detect differences between the transactions and, as described, may compare the fields through any number of known methods, including those methods utilized for transactions having the same transaction structure. Indeed, the clearing system 400 may perform comparisons between fields that do not have the same format. For example, the clearing system 400 may compare the dates of one transaction date field in a yyyy-mm-dd format with a transaction date field that is in a mm/dd/yyyy format. The clearing system 400 may further be configured to detect errors between transactions where fields have been combined. Thus, errors may be detected even where a transaction, at one system, may contain two fields for a customer's name and the same transaction, at a second transaction system, may combine the two fields into one for use. Thus, as seen in FIG. 6, the first name field and the last name field of transactions at transaction system 408 may be readily compared with the full name field of transaction system 408N.

The clearing system 400 may also compare data fields even when the same field at the other transaction system may contain additional data. Thus, the clearing system 400 may automatically parse out portions of data of a field for comparison with a corresponding field. As one example, a transaction at transaction system 408 may contain a zip code field containing the 5-digit zip code while the same transaction at transaction system 408N may contain a field containing the full 9-digit zip code. The clearing system may, nonetheless, automatically parse out the first five digits of the zip code field of transactions at transaction systems 408N for comparison accordingly. The clearing system 400 may further be configured to compare two or more data fields where a data field or portions of a data field at a transaction system is encrypted. The clearing system may automatically decrypt the portions decrypted for proper comparison. Other types of comparisons include comparisons of the fields containing differing languages, currencies, markets, finance systems, and others.

The clearing system 400 may perform various other comparisons of transactions based on business logic. Even where there are differences between two fields, such differences may not be an error due to business or financial reasons. For example, the differences in payment amount at one system may contain tax while the same transaction at another system may not include tax. Similarly, the payee name associated with a transaction may differ. A transaction system may associate a transaction with the primary account holder while another transaction system may associate the same transaction with the secondary user account. In one embodiment, the clearing system may also identify duplicate or missing transactions at each of the transaction systems.

Indeed, the clearing system 400 is a versatile and dynamic comparison system that allows comparisons of transactions and transaction fields to take place in any number of manners. In one embodiment, the clearing system 400 may analyze the fields for similarities to detect fields that may correspond to each other. For example, the clearing system 400 may automatically detect that a field containing "2010-04-10" may correspond to the field "04-10-2010." The clearing system 400 may ask the user to verify that these fields indeed correspond with one another and may update its system model database accordingly. Thus, the clearing system 400 may learn, over time, and improve the comparisons that are conducted. As a result, the detection of errors may improve over time.

Not only may the comparison methods made by the clearing system 400 be completely customized by the user, but whether particular differences between transactions would be detected may also be customized by the user. The system may not detect for may filter out) insubstantial or "noise" differences between two or more transactions. For example, detected differences in the time-stamp of a transaction at one system, as compared to another system, may be ignored automatically by the system. As another example, extra spaces may not be detected as an error. Further, whether errors are detected by the clearing system may be configured on a field-by-field basis.

The clearing system 400 may further perform various other transaction integrity tests within various transaction systems. In one embodiment, the clearing system may further test a transaction system against one or more transaction standards utilized at the financial institution. For example, the system may be configured to ensure that the transaction data meets the financial data standards set by the International Organization for Standardization (ISO) or by rules defined by a user. Thus, the clearing system 400 may compare the transactions outputted from transaction system 412 against the transaction ISO standard. The clearing system 400 may retrieve the ISO standard applicable for a selected system from a database of the clearing system 400 and compare the structure of each transaction at transaction system 412 against the ISO standard. The clearing system 400 may also ensure that each data entry for each field complies with the ISO standard. Other actions that may be taken by clearing system 400 in relation to a transaction system may include ensuring that the output of transactions data at a transaction system 412 is properly stored at one or more databases and ensuring that each output of transaction data is properly outputted to a regulating agency or other financial institutions.

In one embodiment, the clearing system 400 may not only detect errors in the transaction data but may also detect the source or cause of the error at a particular system of a financial institution and detect duplicate or missing data. Thus, clearing system 400 may not only detect that the transactions at transaction system 408N differ from the transaction system 408 and identify the transactions and/or fields that differ, but it may further identify the cause of the error. For example, clearing system 400 may identify that a field at a transaction system or a database is incorrectly defined, structured or formatted; a particular program is incorrectly creating, modifying, or deleting a field; an employee has mistakenly entered a field entry; a system crash or interrupt has caused the error; and others.

Once the tests have been completed, the clearing system 400 may generate a report describing the errors detected. For instance, the report may present the user with an identification of the differences between each of the transactions that were found to differ in content, structure or in other manners. The user may be presented with a view of each transaction as stored at each of the transaction systems. For example, the user may be shown a side-by-side view of transaction 408-0001 of transaction systems 408 and 408N of FIG. 6. The difference may be highlighted for the user in the report (i.e., in red) and the specific portions of the transaction that differ may be highlighted for easy identification to the user. Where the clearing test involves the clearing of transactions along one or more workflows, all errors detected along the workflow may be identified to the user. The user may also be presented with the source of the error as well as a proposed fix. In one embodiment, the report further comprises statistics of the test results, including the number of files compared, the number of errors detected, the number of transactions detected, and others.

In one embodiment, the clearing system may further provide one or more notifications and/or the report to administrators of each transaction system in which errors were found, including identifying the particular transactions containing errors.

Embodiments of the present invention further allow a user to define the relationship between transactions of two or more transaction systems. For example, a user may define the relationship between transactions at transaction systems 408N and 408 of FIG. 6. In particular, the user may set which field of a transaction at 408N corresponds to which fields of a transaction at 408. The user may further configure how each of such fields relate; for example: whether the fields should contain the same; exact or a portion of the information; contain a translation; contain the same digits, contain the same amount (regardless of currency); and so on. The clearing system 400, in one embodiment, stores such information in at least one database for use by the various engines and components of the clearing system 400. In another embodiment, the clearing system comprises a global library of fields utilized by the various transaction systems. The global library of fields may contain relational databases relating each field at each transaction system with one another (if applicable).

In at least one embodiment, the clearing system 400 may be configured to verify the integrity of any type of data at any type of system, not just of those systems that process financial transaction data. For example, embodiments of the present invention may be used to ensure the proper operations of new systems that are replacing legacy systems configured to receive and process social network transactions, student college applications, governmental benefits application transactions, and so on. It should be readily apparent to one of ordinary skill in the art that the presently disclosed invention may be implemented in a wide range of industries including any businesses and institutions that would benefit from a clearing system capable of verifying the integrity of financial and non-financial transactions that traverse through a plurality of financial systems making up one or more system workflows.

As a person of ordinary skill in the art would appreciate, embodiments of the clearing system may be utilized to test the integrity of transactions as they traverse a plurality of transaction systems, ensuring that fields are not changed erroneously. Since a typical financial transaction runs through 6 or more systems before fully being processed or by being routed out to a different institution, and since transactions are often transformed into different message formats along each step of the workflow, the clearing system may be utilized to ensure that, for a given transaction, any modifications made to the transaction structure or format do not erroneously alter the transaction data. In such cases, transaction data at each transaction system long the workflow may be compared with one another to detect differences and errors. Further, the clearing system may be integrated into one or more systems of the financial institution such that transaction data is continuously processed by the clearing system and the clearing system may dynamically detect errors on a day-to-day basis.

The various embodiments and features of the presently disclosed invention may be used in any combination, as the combination of these embodiments and features are well within the scope of the invention. While the foregoing description includes many details and specificities, is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

These examples and embodiments are merely illustrative of the clearing system of the present invention. While particular embodiments of the invention have been illustrated and described in detail herein, it should be understood that various changes and modifications might be made to the invention without departing from the scope and intent of the invention. Indeed, it should be readily apparent to one of ordinary skill in the art that the presently disclosed alert system may be modified to operate in an operational banking computer system.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A transaction clearing system for receiving selections for verifying transactions at a plurality of transaction systems and verifying a plurality of transactions having a plurality of transaction data structures, the transaction clearing system comprising:
   a system modeling database stored in non-transitory memory, the system modeling database storing transaction model data;
   at least one computer processor, the computer processor, in response to receiving a selection of a plurality of transactions over at least one of a plurality of communication channels, automatically executing stored executable computer instructions to perform at least the following:
      retrieving transaction data of the plurality of transactions over the plurality of communication channels from a plurality of data sources based on the received selection;
      processing the transaction data to detect a transaction data structure of at least a portion of said transaction data;
      generating a datum identifying the detected transaction data structure;
      retrieving transaction model from the system modeling database based on the datum identifying the detected transaction data structure; and
      executing the transaction model to verify transaction data integrity based on the transaction data and the transaction modeling data.

2. The transaction clearing system of claim 1, wherein the transaction data comprises first transaction data and second transaction data and the computer processor further executes stored executable computer instructions to retrieve the first transaction data from a first transaction system and the second transaction data from a second transaction system.

3. The transaction clearing system of claim 2, wherein a user interface engine receives a selection of a plurality of testing transactions included in the first transaction data or the second transaction data.

4. The transaction clearing system of claim 2, wherein a user interface engine receives a selection of a workflow that includes a plurality of transactions.

5. The transaction clearing system of claim 2, wherein a user interface engine receives a selection of at least one of the first transaction system and the second transaction system.

6. The transaction clearing system of claim 2, wherein the verifying of transaction data integrity comprises comparing the first transaction data with the second transaction data.

7. The transaction clearing system of claim 6, wherein the computer processor further executes stored executable computer instructions to compare the first transaction data with the second transaction data based on business logic.

8. The transaction clearing system of claim 7, wherein the computer processor further executes stored executable computer instructions to compare fields of the first transaction data and the second transaction data to verify transaction data.

9. The transaction clearing system of claim 7, wherein the computer processor further executes stored executable computer instructions to further compare the first transaction data and the second transaction data in accordance with a common unique identifier.

10. The transaction clearing system of claim 6, wherein the computer processor further executes stored executable computer instructions to compare the first transaction data with the second transaction data on at least one of: a letter-by-letter basis and a bit-by-bit basis.

11. The transaction clearing system of claim 1, wherein the computer processor further executes stored executable computer instructions to determine the result based on a pass/fail determination.

12. The transaction clearing system of claim 1, wherein the computer processor further executes stored executable computer instructions to parse the transaction data into a plurality of transactions and each transaction of the plurality of transactions into a plurality of fields.

13. The transaction clearing system of claim 1, wherein the computer processor further executes stored executable computer instructions to verify transaction data integrity based on at least one integrity rule or transaction standard.

14. A computer-controlled method for receiving selections for verifying a plurality of transactions at a plurality of transaction systems and verifying the plurality of transactions, the method comprising the steps of:
in response to receiving a selection of a plurality of transactions over at least one of a plurality of communication channels, automatically executing stored executable computer instructions using at least one computer processor to perform at least the following:
retrieving transaction data of the plurality of transactions over the plurality of communication channels from a plurality of data sources based on the received selection;
processing the transaction data to detect a transaction data structure of at least a portion of said transaction data;
generating a datum identifying the detected transaction data structure;
retrieving transaction model from the system modeling database based on the datum identifying the detected transaction data structure; and
executing the transaction model to verify data integrity based on the transaction data and the transaction modeling data.

15. The computer-controlled method of claim 14, wherein the transaction data comprises first transaction data and second transaction data and wherein the step of retrieving transaction data comprises retrieving the first transaction data from a first transaction system and the second transaction data from a second transaction system.

16. The computer-controlled method of claim 15, wherein the step of receiving a selection for verifying a plurality of transactions at a plurality of transaction systems comprises receiving a selection of at least one of the following:
a plurality of testing transactions, wherein the first transaction data and the second transaction data includes the plurality of testing transactions utilized to test the integrity of a system against a corresponding legacy system;
a workflow, wherein the first transaction data and the second transaction data includes transactions of the workflow; and
the first transaction system and the second transaction system.

17. The computer-controlled method of claim 15, wherein the verifying of transaction data integrity comprises comparing the first transaction data with the second transaction data.

18. The computer-controlled method of claim 17, wherein the comparing the first transaction data with the second transaction data is based on business logic.

19. The computer-controlled method of claim 18, wherein comparing the first transaction data with the second transaction data based on business logic further comprises comparing the first transaction data and the second transaction data based on a common unique identifier.

20. The computer-controlled method of claim 17, wherein the comparing the first transaction data with the second transaction data comprises comparing based on least one of: a letter-by-letter basis or a bit-by-bit basis.

\* \* \* \* \*